April 14, 1953
T. D. CLARK
2,634,445
OIL GAUGE ROD WIPER
Filed Oct. 26, 1949
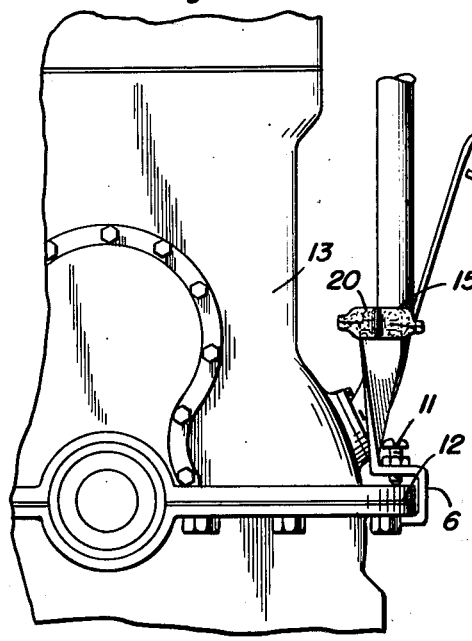
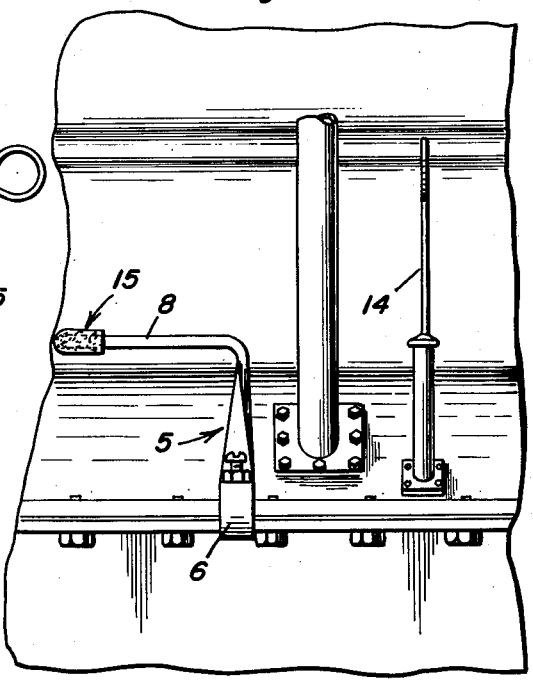
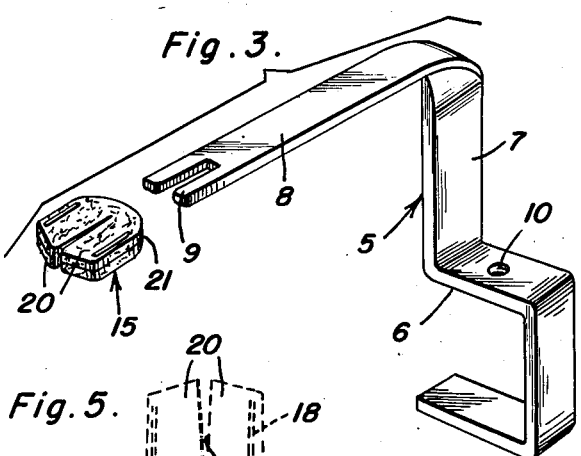
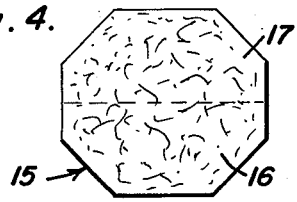
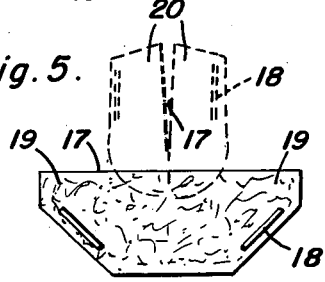
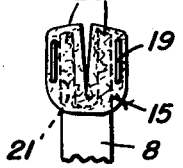
Theodore D. Clark
INVENTOR.
BY Patented Apr. 14, 1953

2,634,445

UNITED STATES PATENT OFFICE 2,634,445

OIL GAUGE ROD WIPER

Theodore D. Clark, Cherokee, Iowa

Application October 26, 1949, Serial No. 123,653

1 Claim. (Cl. 15—210)

The present invention relates to new and useful improvements in oil gauge rod wipers for cleaning the gauge rod without necessitating handling the oil coated end thereof.

An important object of the invention is to provide a novel wiping element and supporting bracket therefor which may be easily and quickly installed in position at the side of an automobile engine adjacent the gauge rod for wiping and cleaning the rod by drawing the rod through the wiping element.

A still further object is to provide a device of this character of simple and practical construction, which is strong and durable, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of the wiper shown in position on the engine;

Figure 2 is a side elevational view thereof;

Figure 3 is an enlarged group perspective view of the wiping element and supporting bracket therefor;

Figure 4 is a plan view of the blank piece of material from which the wiping element is formed;

Figure 5 is a top plan view showing the blank after being folded to form pockets in the wiping element for mounting on the bracket, and Figure 6 is a top view showing the wiping element supported on the bracket.

Referring now to the drawing in detail wherein for the purpose of illustration I have disclosed a preferred embodiment of the invention, the numeral 5 designates the wiper bracket generally and which is constructed of rigid strap metal having one end shaped to provide a U-shaped clamp 6 having a post 7 rising therefrom and a horizontal arm 8 at the upper end of the post and positioned laterally with respect to the clamp 6. The outer end of arm 8 is forked or bifurcated as shown at 9.

The upper portion of clamp 6 is formed with a threaded opening 10 for receiving a set screw 11 to secure clamp 6 on the flange 12 at one side of the engine 13 of a motor vehicle in a position adjacent the gauge rod 14 which is usually carried in a position to project downwardly into the crankcase of the engine.

The wiper element is shown generally at 15 and comprises a substantially octagonal-shaped pad 16 of felt, absorbent rubber, or other suitable material foldable along its medial line 17 upon itself and secured in its folded position by staples 18 adjacent its narrow ends 19.

The edges of the pad, at its folded medial edges 17 and at its stapled edges are closed, while the remaining edges of the pad are open, and the narrow ends 19 are then folded toward each other in the plane of the pad and at the center of the folded medial line 17 as shown by dotted lines in Figure 5 to form a pair of jaws 20 having pockets 21 formed therein by the staples 18, and in the rear open ends of which the forked or bifurcated end 9 of arm 8 is inserted to support the pad thereon.

The gauge rod 14 may then be drawn between the jaws 20 of the wiper element or pad 15 to clean the rod.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having thus described the invention, what is claimed as new is:

A wiper element for a gauge rod wiper comprising a flat pad of absorbent material folded upon itself along a transverse medial line to form a double elongated layer of material united along one longitudinal edge while the remaining longitudinal edge is free, and means adjacent each end portion of the folded layers securing the end portions of the layers to each other while the free longitudinal edges of the folded layers between said securing means remain free, said ends of the pad being foldable edgewise inwardly toward each other at the united longitudinal edge of the pad from a point at the center of the united longitudinal edge to provide a pair of substantially parallel pockets at the free longitudinal edge of the pad adapted to receive the forked end of a support for the pad, said pad, when mounted on said forked end of the support, being held with the inwardly folded end portions of the pad substantially parallel to each other to form a V-shaped notch therebetween at the united edges of the layers adapted to receive a gauge rod for wiping in the notch.

THEODORE D. CLARK.

References Cited in the file of this patent

UNITED STATES PATENTS

| Number | Name | Date |
| --- | --- | --- |
| 1,922,450 | O'Brien | Aug. 15, 1933 |
| 2,042,255 | Haas | May 26, 1936 |
| 2,250,374 | Hays | July 22, 1941 |